United States Patent
Matsui (10) Patent No.: US 7,529,973 B2
(45) Date of Patent: May 5, 2009

(54) METHOD OF AND APPARATUS FOR TAKING BACK-UP AND CHECKING ALTERATION OF DATA, AND COMPUTER PRODUCT

(75) Inventor: Takayuki Matsui, Tokyo (JP)

(73) Assignees: Fujitsu Limited, Kawasaki (JP); Fujitsu Frontech Limited, Tokyo (JP)

(*) Notice: Subject to any disclaimer, the term of this patent is extended or adjusted under 35 U.S.C. 154(b) by 260 days.

(21) Appl. No.: 10/758,043

(22) Filed: Jan. 16, 2004

(65) Prior Publication Data

US 2004/0172426 A1    Sep. 2, 2004

(30) Foreign Application Priority Data

Feb. 27, 2003    (JP)    ............... 2003-051025

(51) Int. Cl.
*G06F 11/00*    (2006.01)
(52) U.S. Cl. ......................................... 714/20; 707/204
(58) Field of Classification Search .................... 714/20
See application file for complete search history.

(56) References Cited

U.S. PATENT DOCUMENTS

| | | | | |
|---|---|---|---|---|
| 5,758,067 | A | * | 5/1998 | Makinen et al. ............... 714/54 |
| 5,943,688 | A | * | 8/1999 | Fisher et al. ................. 711/162 |
| 6,073,220 | A | * | 6/2000 | Gunderson .................. 711/162 |
| 6,085,298 | A | * | 7/2000 | Ohran ........................ 711/162 |
| 6,243,705 | B1 | * | 6/2001 | Kucala ......................... 707/10 |
| 6,950,836 | B2 | * | 9/2005 | Lohn et al. .................. 707/204 |
| 2002/0144070 | A1 | | 10/2002 | Watanabe et al. |
| 2003/0018657 | A1 | * | 1/2003 | Monday ..................... 707/204 |
| 2003/0028682 | A1 | * | 2/2003 | Sutherland .................. 709/315 |
| 2003/0088592 | A1 | * | 5/2003 | Innan et al. ................. 707/204 |
| 2004/0066741 | A1 | * | 4/2004 | Dinker et al. ............... 370/216 |

FOREIGN PATENT DOCUMENTS

| | | |
|---|---|---|
| JP | 7-44392 A | 2/1995 |
| JP | 2000-132459 A | 5/2000 |
| JP | 2000-339223 A | 12/2000 |
| JP | 2001-243119 A | 9/2001 |
| JP | 2002-189823 A | 7/2002 |
| JP | 2002-297455 | 10/2002 |
| JP | 2003-22009 A | 1/2003 |

* cited by examiner

*Primary Examiner*—Scott T Baderman
*Assistant Examiner*—Paul F. Contino
(74) *Attorney, Agent, or Firm*—Staas & Halsey LLP (57) ABSTRACT

The invention relates to taking a back-up of original data and deciding whether the original data has been altered. A back-up of the original data is taken by copying the original data from one storing unit to other storing unit as back-up data. Once the copying is over, it is decided whether the original data has been altered based on a comparison between the original data and the back-up data. All the requests for access to the original data received while the original data is being copied are denied but request received while alteration of the original data is being decided are allowed.

9 Claims, 7 Drawing Sheets

| No. | CATEGORY | MEDIUM ID | SERIAL No. | FILE | PASS |
|---|---|---|---|---|---|
| 45 | DAILY | D20030203 | | DOCUMENT A (ONLY ALTERED PORTION IS SAVED) | x/y/z/a |
| | | | | DOCUMENT B (ONLY ALTERED PORTION IS SAVED) | x/y/z/b |
| | | | | DOCUMENT C (ONLY ALTERED PORTION IS SAVED) | x/y/z/c |
| 46 | MONTHLY | M200302 | 1 | DOCUMENT A (ALL ENVIRONMENTS ARE SAVED) | x/y/z/a |
| | | | | DOCUMENT B (ALL ENVIRONMENTS ARE SAVED) | x/y/z/b |
| | | | | DOCUMENT C (ALL ENVIRONMENTS ARE SAVED) | x/y/z/c |
| 47 | MONTHLY | M200302 | 2 | DOCUMENT A (ALL ENVIRONMENTS ARE SAVED) | x/y/z/a |
| | | | | DOCUMENT B (ALL ENVIRONMENTS ARE SAVED) | x/y/z/b |
| | | | | DOCUMENT C (ALL ENVIRONMENTS ARE SAVED) | x/y/z/c |
| 48 | MONTHLY | M200302 | 3 | DOCUMENT A (ALL ENVIRONMENTS ARE SAVED) | x/y/z/a |
| | | | | DOCUMENT B (ALL ENVIRONMENTS ARE SAVED) | x/y/z/b |
| | | | | DOCUMENT C (ALL ENVIRONMENTS ARE SAVED) | x/y/z/c |

FIG.3

| No. | GENE-RATION | CATE-GORY | MEDIUM ID | SE-RIAL No. | BACKED-UP DATE | ALTERATION CHECKED DATE | ALTERATION CHECKING STATUS |
|---|---|---|---|---|---|---|---|
| 1 | PREVIOUS TWO GENERATIONS | DAILY | D20021202 |  | 2002.12.02 | 2002.12.02 | CHECKED:OK |
| 2 | | MONTHLY | M200212 | 1 | 2002.12.02 | 2002.12.04 | CHECKED:OK |
| 3 | | MONTHLY | M200212 | 2 | 2002.12.02 | 2002.12.04 | CHECKED:OK |
| 4 | | MONTHLY | M200212 | 3 | 2002.12.02 | 2002.12.04 | CHECKED:OK |
| 5 | | DAILY | D20021203 |  | 2002.12.03 | 2002.12.03 | CHECKED:OK |
| 6 | | DAILY | D20021204 |  | 2002.12.04 | 2002.12.04 | CHECKED:OK |
| 7 | | DAILY | D20021205 |  | 2002.12.05 | 2002.12.05 | CHECKED:OK |
| ⋮ | | ⋮ | ⋮ | ⋮ | ⋮ | ⋮ | ⋮ |
| 22 | | DAILY | D20021227 |  | 2002.12.27 | 2002.12.27 | CHECKED:OK |
| 23 | PREVIOUS GENERATION | DAILY | D20030106 |  | 2003.01.06 | 2003.01.06 | CHECKED:OK |
| 24 | | MONTHLY | M200301 | 1 | 2003.01.06 | 2003.01.08 | CHECKED:OK |
| 25 | | MONTHLY | M200301 | 2 | 2003.01.06 | 2003.01.08 | CHECKED:OK |
| 26 | | MONTHLY | M200301 | 3 | 2003.01.06 | 2003.01.08 | CHECKED:OK |
| 27 | | DAILY | D20030107 |  | 2003.01.07 | 2003.01.07 | CHECKED:OK |
| 28 | | DAILY | D20030108 |  | 2003.01.08 | 2003.01.08 | CHECKED:OK |
| 29 | | DAILY | D20030109 |  | 2003.01.09 | 2003.01.09 | CHECKED:OK |
| ⋮ | | ⋮ | ⋮ | ⋮ | ⋮ | ⋮ | ⋮ |
| 44 | | DAILY | D20030131 |  | 2003.01.31 | 2003.01.31 | CHECKED:OK |
| 45 | LATEST | DAILY | D20030203 |  | 2003.02.03 | 2003.01.06 | CHECKED:OK |
| 46 | | MONTHLY | M200302 | 1 | 2003.02.03 | ---- | NOT-YET-CHECKED |
| 47 | | MONTHLY | M200302 | 2 | 2003.02.03 | ---- | NOT-YET-CHECKED |
| 48 | | MONTHLY | M200302 | 3 | 2003.02.03 | ---- | NOT-YET-CHECKED |
| 49 | | DAILY | D20030204 |  | 2003.02.04 | 2003.02.04 | CHECKED:OK |
| 50 | | | | | | | |
| 51 | | | | | | | |
| 52 | | | | | | | |
| 53 | | | | | | | |

METHOD OF AND APPARATUS FOR TAKING BACK-UP AND CHECKING ALTERATION OF DATA, AND COMPUTER PRODUCT

BACKGROUND OF THE INVENTION

1) Field of the Invention

The present invention relates to a technology for taking a back-up of data and also checking whether the data has been altered.

2) Description of the Related Art

The data, for example, original documents, needs assurance of authenticity at all times. Generally, a back-up of the data is taken to prevent loss of the data in case the hardware that stores the data fails. Moreover, by comparison of the original data and the backed-up data it is possible to check the authenticity of the data. The authenticity includes requirements such as data integrity, confidentiality, and readability, and the authenticity mentioned here indicates the data integrity.

Japanese Patent Application Laid Open No. 2003-022009 (pages 1 and 2, FIG. 1) discloses a related technology. According to the technology disclosed in this publication, access to the data is not allowed when the process of back-up or checking of the authenticity is being performed. However, according to this technology, because all the requests for the access to the data are denied, even the instructions for usual operations are also ignored. Moreover, because it takes much longer time for checking of the alteration of the data than for taking a back-up of the data, no other operation can be performed during when the checking of the alteration of the data.

SUMMARY OF THE INVENTION

It is an object of the present invention to solve at least the problems in the conventional technology.

An alteration checking apparatus according to one aspect of the present invention includes a back-up unit that copies original data from an original data storage unit to a back-up data storage unit as back-up data; and an alteration deciding unit that, after copying of the original data as the back-up data is over, decides whether the original data has been altered based on a comparison between the original data and the back-up data.

A method of taking a back-up of original data and deciding whether the original data has been altered according to another aspect of the present invention includes copying the original data as back-up data; and deciding, after the copying is over, whether the original data has been altered based on a comparison between the original data and the back-up data.

A computer program according to still another aspect of the present invention realizes on a computer the above method according to the present invention.

The other objects, features and advantages of the present invention are specifically set forth in or will become apparent from the following detailed descriptions of the invention when read in conjunction with the accompanying drawings.

DETAILED DESCRIPTION

Exemplary embodiments of a method of, an apparatus for, and a computer program for taking a back-up of data and checking whether that data has been altered according to the present invention are explained in detail below with reference to the accompanying drawings.

Figure 1:
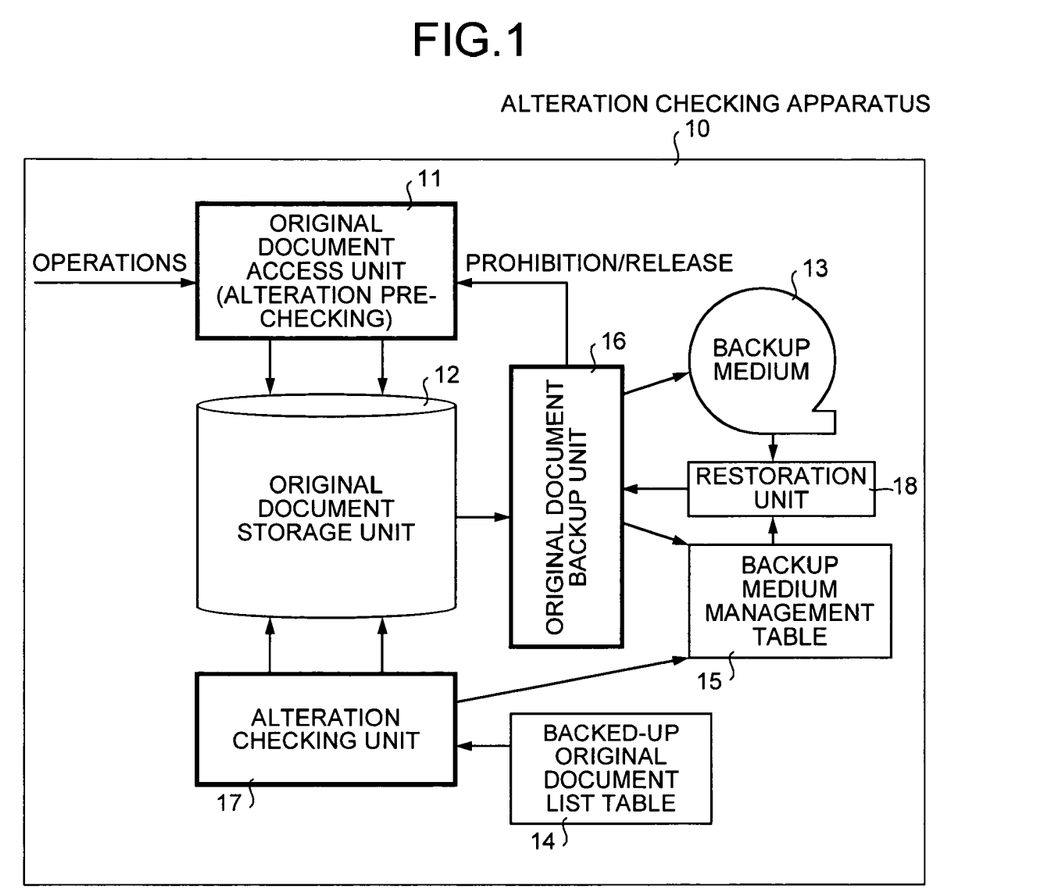
FIG. 1 is a block diagram of an alteration checking apparatus according to an embodiment of the present invention.

FIG. 1 is a block diagram of an alteration checking apparatus 10 according to an embodiment of the present invention. The alteration checking apparatus 10 reads data for an original document (hereinafter, original data") stored in a storage unit (hereinafter, "an original document storage unit"), into which data can be written or from which data can be read from outside, and checks whether the data is altered while the reading or the writing operation is performed. The alteration checking apparatus 10 also takes a back-up of the data stored in the original document storage unit into a specified medium and checks whether the data that has been backed-up is altered.

The alteration checking apparatus 10 is characterized in that it is configured to take a back-up of the original data without checking alteration thereof, and that the alteration of the backed-up data is checked by referring to the data stored in the original document storage unit.

In other words, the alteration checking apparatus 10 takes a back-up of the original data and denies any access request received while the back-up is being taken. Once the back-up is over, the alteration checking apparatus 10 checks whether the data has been altered and allows any access request received while the alteration of the data is being checked. In this manner, because the access requests are denied during the quicker back-up operation and access requests are allowed during the time-taking alteration checking operation, it enables to process the access requests more effectively.

Therefore, unlike the example of the conventional technology, the alteration checking apparatus 10 does not perform the pre-checking of alteration that requires an extremely long time, and prohibits the access only when the data is backed up from the original document storage unit. Therefore, it is possible to reduce influence upon the operations to a minimum when the original document data is backed up.

Moreover, the alteration checking apparatus stores and manages a plurality of original document data whenever each of the original document data is backed up. Furthermore, the alteration checking apparatus finishes checking alteration of the data stored in the original document storage unit corresponding to the backed-up data, and adds information indicating assurance of authenticity, to the data that is not altered. Therefore, it is possible to assure the integrity of the backed-up original document data.

Further, the alteration checking apparatus performs pre-checking of alteration of original document data related to an access request each time the access request is notified, and adds information indicating that the authenticity thereof is assured, to the original document data verified that it is not altered. Therefore, it is possible to preferentially check whether the data related to the access request is altered, and prevent alteration of original document data that has been backed up but has not been checked yet whether it is altered.

When the alteration of data for an original document is detected, the data is restored based on latest-generation data of the original document data stored in the backup medium. Therefore, if alteration is detected in the alteration checking processing, the data can be restored to the latest state right before the data is altered.

The alteration checking apparatus 10 includes an original document access unit 11, an original document storage unit 12, a backup medium 13, a backed-up original document list table 14, a backup medium management table 15, an original document backup unit 16, an alteration checking unit 17, and a restoration unit 18.

The original document access unit 11 is a processor that makes access by operations to original document data stored in the original document storage unit 12. More specifically, the original document access unit 11 accesses the stored original document data (important document including an electronic document or electronic data) and updates the original document data according to situations of the operations. The original document storage unit 12 includes a RAID (Redundant Arrays of Inexpensive Disks) device. A plurality of physical disk drives are used for such a file device, and logical disks are formed so that they can be accessed by the respective drives connected thereto. Therefore, a plurality of original document data is accessibly stored in the storage unit by using a logical address of the logical disk drive.

The original document access unit 11 performs pre-checking whether original document data related to an access request is altered each time the access request is notified, and adds information indicating that the authenticity thereof is assured, to the original document data verified that it is not altered. More specifically, the original document data related to the access request is checked whether it is altered each time the access request is notified. If the alteration is not detected through the pre-checking of alteration, "OK" is entered in "Alteration checking status" Column related to the checked original document data, in the backup medium management table 15.

The backup medium 13 is a storage means that stores original document data backed-up by the original document backup unit 16. More specifically, the backup medium 13 includes a computer-readable recording medium such as a magnetic tape, hard disk, flexible disk (FD), compact disk recordable (CD-R), magneto-optic disk (MO), digital versatile disk recordable (DVD-R), and digital versatile disk random access memory (DVD-RAM). It is noted that the backup medium 13 is dismounted when backup is finished, so that the backup medium 13 is prevented from being accessed from the outside.

Figure 2:
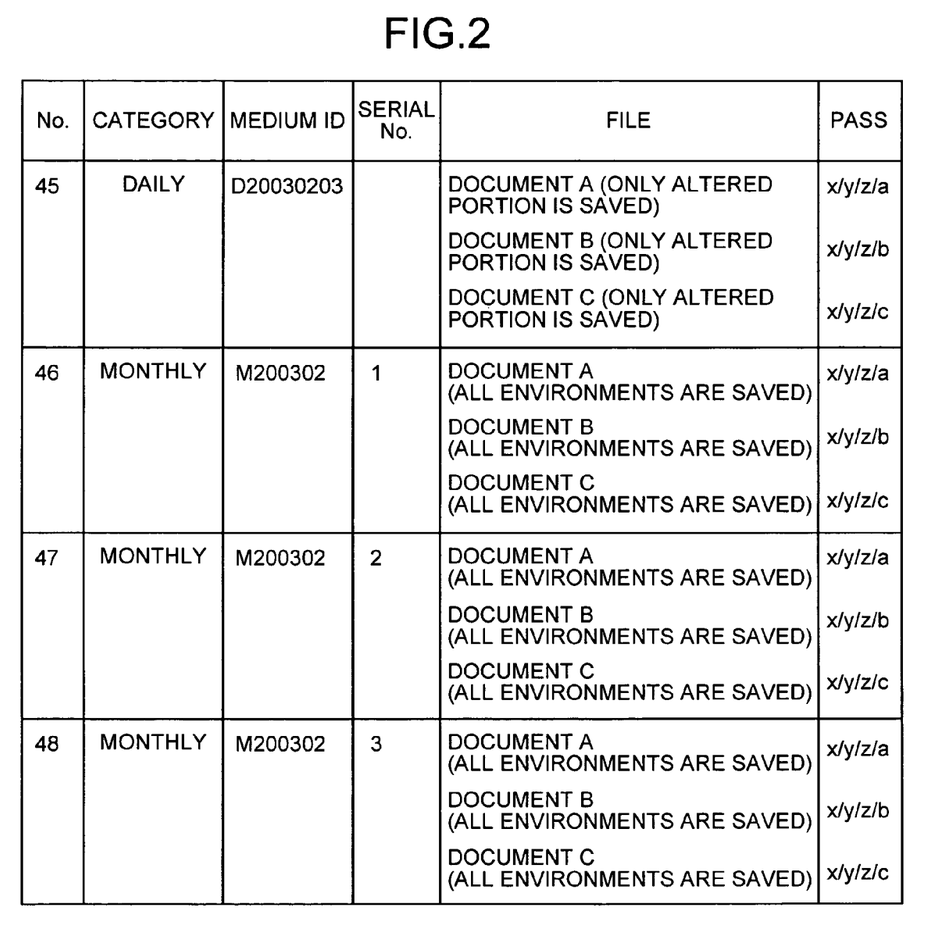
FIG. 2 is an example of a backed-up original document list table.
Figure 3:
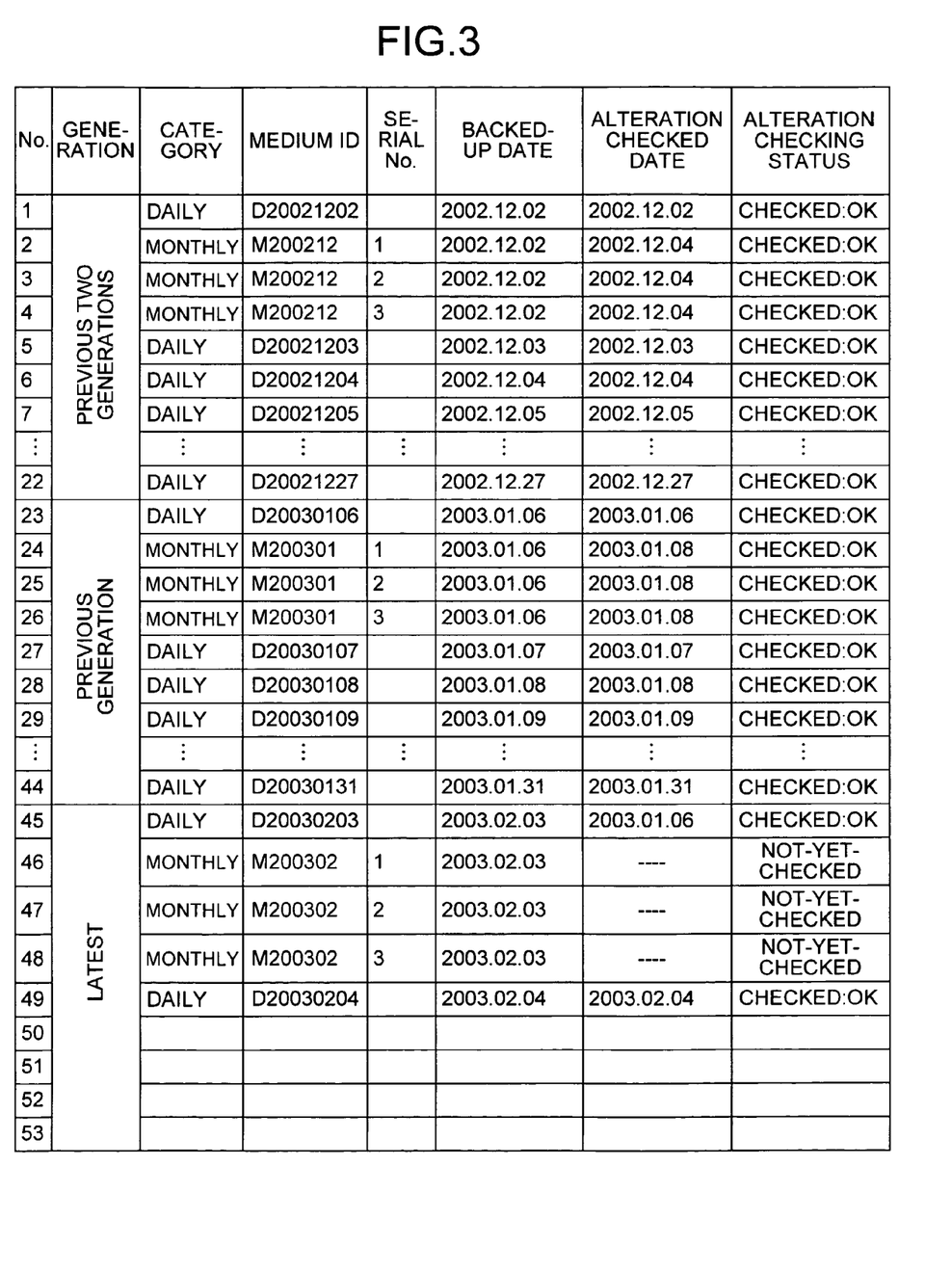
FIG. 3 is an example of a backup medium management table.
Figure 5:
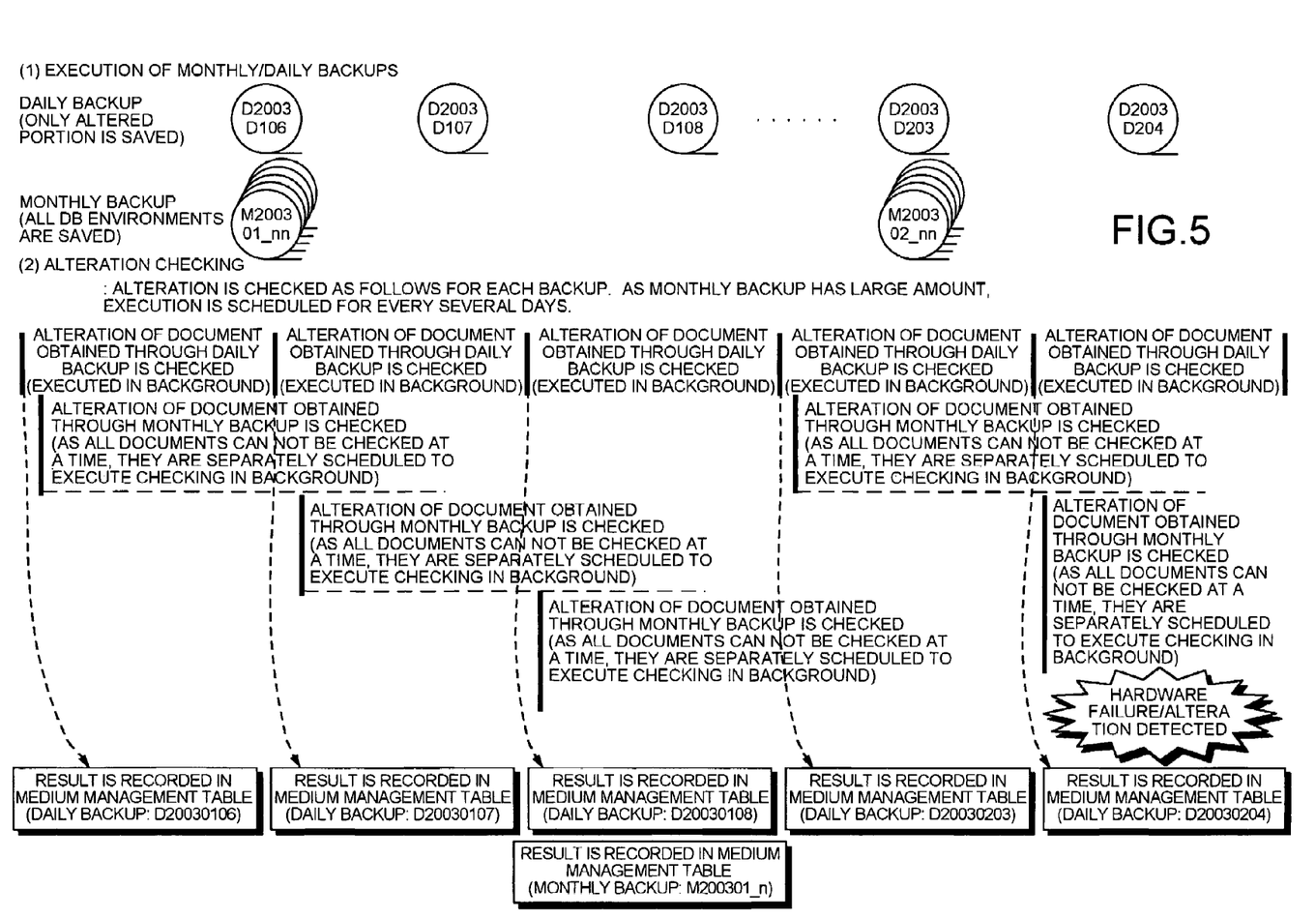
FIG. 5 is to explain the concept of a restoration processing.

Further, the backup medium 13 manages daily backups and monthly backups by a plurality of generations (generation on a monthly basis) (FIG. 2, FIG. 3, and FIG. 5). The daily backups are obtained by backing up only a portion of daily update in original document data, and the monthly backups are obtained by backing up all environments for the original document data. If the alteration of the data for the original document is detected, the data is restored using the daily backups and the monthly backups. The restoration processing for restoring the original document data will be explained later.

The backed-up original document list table 14 is a processor that stores lists of original document data backed-up by the original document backup unit 16 in correlation with medium identifications (medium IDs) (FIG. 2). The backup medium management table 15 is a processor that stores the medium IDs in correlation with alteration checking statuses (FIG. 3).

The original document backup unit 16 is a processor that backs up data for an original document stored in the original document storage unit 12 without checking alteration thereof. More specifically, the backup unit 16 prohibits access by the original document access unit 11 to the storage unit 12, and backs up original document data (e.g., document A, document B, and document C on Feb. 3, 2003) to the backup medium 13. At the same time, the backup unit 16 enters a list of the backed-up original documents (document A, document B, and document C on Feb. 3, 2003) in the backed-up original document list table 14 in correlation with a medium ID (D20030203) of the backup medium 13. Further, the backup unit 16 enters the medium ID (D20030203) in the backup medium management table 15 and also enters "not-yet-checked" in the Alteration checking status Column (FIG. 2 and FIG. 3).

The alteration checking unit 17 is a processor that checks whether original document data is altered based on the backed-up original document list table 14 by referring to the original document data stored in the original document storage unit 12. The processor adds information indicating that authenticity is assured, to data, in the list table 14, verified that it is not altered.

In other words, the alteration checking unit 17 checks alteration of a file (document A, document B, and document C on Feb. 3, 2003) as a target for alteration checking stored in the original document storage unit 12, based on a pass stored in the list table 14. If the alteration is not detected, the alteration checking unit 17 enters "OK" in the Alteration checking status Column (related to D20030203) in the backup medium management table 15 (FIG. 2 and FIG. 3). During execution of the operations, "alteration checking processing" is executed in background.

Furthermore, one original document data is structured by a plurality of units of accesses. The unit of access is, for example, one logical block, and the access to the original document storage unit is performed by each logical block. The alteration checking unit 17 preferentially checks alteration of the unit of access for original document data related to an access request, each time the access request for the logical block included in the original document data is notified, and assures that the original document data is not altered. Accordingly, access to the unit of access for the original document data can be permitted without finishing the alteration checking of the whole original document data, and it is therefore possible to make access to an area for the backed-up original document data in the original document storage unit.

The backup processing of the embodiment is executed by using a function of the RAID device, for example, a function described in Japanese Patent Application Laid Open (JP-A) No. 2002-297455. The function is such that a notification of completion of the backup processing is sent back to a connected host device which has instructed to back up data, and copying to an actual backup medium is executed in background. By using such a function, it is possible to reduce the time, during which access to the original document storage unit for backup is prohibited, to a minimum. Further, it is possible to easily manage times when backup of the logical blocks constituting the original document data is ended and when checking alteration thereof is ended, by using bitmaps described in JP-A No. 2002-297455.

The restoration unit 18 is a processor that restores original document data, when the alteration thereof is detected by the alteration checking unit 17, based on the latest-generation data of the original document data stored in the backup medium. More specifically, the restoration unit 18 restores the environment of the original document data by the monthly backup stored in the backup medium 13, and restores each daily update of the original document data by the daily backups. It is noted that the latest data of original document data each with "OK" entered in the Alteration checking status Column is used for the monthly backups and the daily backups.

The procedure of various types of processing executed by the alteration checking apparatus 10 of the embodiment is explained below:

(1) Alteration Checking Processing

Figure 4:
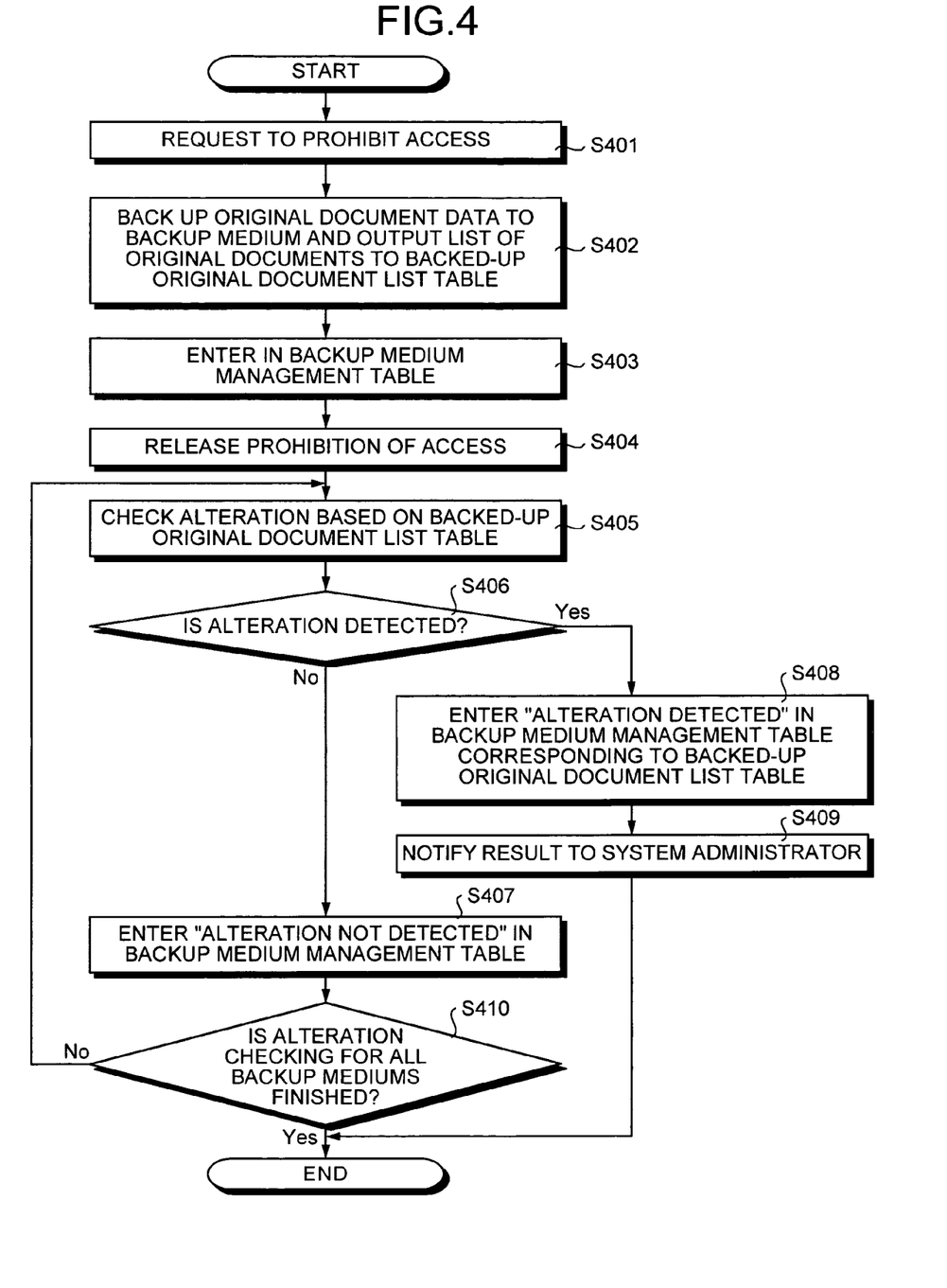
FIG. 4 is a flowchart of the process carried out by the alteration checking apparatus.

FIG. 4 is a flowchart of the process carried out by the alteration checking apparatus. The original document backup unit 16 prohibits access by the original document access unit 11 (step S401), backs up original document data (e.g., document A, document B, and document C on Feb. 3, 2003) to the backup medium 13, and enters a list of the backed-up original documents (document A, document B, and document C on Feb. 3, 2003) in the backed-up original document list table 14 in correlation with the medium ID (D20030203) of the backup medium 13 (step S402).

The original document backup unit 16 enters the medium ID (D20030203) in the backup medium management table 15 and also enters "not-yet-checked" in the Alteration checking status Column (step S403), and releases the prohibition of the access by the original document access unit 11 (step S404).

The alteration checking unit 17 checks alteration of a file (document A, document B, and document C on Feb. 3, 2003) stored in the original document storage unit 12 as a target for alteration checking, based on a pass stored in the list table 14 (step S405). If the alteration is not detected (No at step S406), the alteration checking unit 17 enters "OK" in the Alteration checking status Column (related to D20030203) in the management table 15 (step S407).

When alteration checking is finished for all the original document data in the list table 14 (Yes at step S410), the processing is ended. However, when the alteration checking is not finished (No at step S410), the processing from step S405 to step S409 is executed.

If the alteration is detected (Yes at step S406) in the original document-storage unit 12, the alteration checking unit 17 enters "NG" (Not Good) in the Alteration checking status Column (related to D20030203) in the management table 15 (step S408), and notifies a system administrator of the alteration (step S409). The "restoration processing" for restoring the original document data is explained below.

As explained above, the alteration checking processing that requires an enormous time is not previously performed, and the access is prohibited only when the original document data is backed up from the original document storage unit. The alteration of an area of the original document storage unit, in which the original document data is stored, is preferentially checked, the alteration checking is finished to assure that the alteration is not detected, and then access can be executed immediately. Therefore, there is no need to wait for completion of backing up the original document data and of alteration checking. Thus, it is possible to accept the access to the original document storage unit and perform the processing at once. Further, by executing the backup processing in background, the time for prohibition of the access to the original document storage unit during backing up is reduced.

If the access is made for writing to an area included in original document data, then alteration of the area is preferentially checked. Specifically, the original document data in the original document storage unit has been backed up and then alteration thereof is being checked. If the alteration is not detected, then data is written in the area. Thereafter, alteration checking is continued from the next one of the data, of which alteration checking has been completed, of the original document data. The alteration checking is not particularly required for the area of which alteration has previously been checked because a result that the alteration is not detected is obtained regardless of whether alteration of the area is checked or not.

Furthermore, if the access is made for reading to an area included in original document data, then alteration of the area is preferentially checked. Specifically, the original document data in the original document storage unit has been backed up and then alteration thereof is being checked. If the alteration is not detected, then data is read from the area of the original document data through the original document access unit 11. Thereafter, alteration checking is continued from the next one of the data, of which alteration checking has been completed, of the original document data. The alteration checking is not particularly required for the area of which alteration has been checked because a result that the alteration is not detected is obtained regardless of whether alteration of the area is checked or not. By doing this, influence upon the operations due to backing up of the original document data and checking of alteration thereof can be reduced to a minimum.

(2) Restoration Processing

The "restoration processing" for restoring original document data, required when the alteration is detected in the "alteration checking processing", is explained below.

(A) Monthly Backup Extraction Processing

Figure 6:
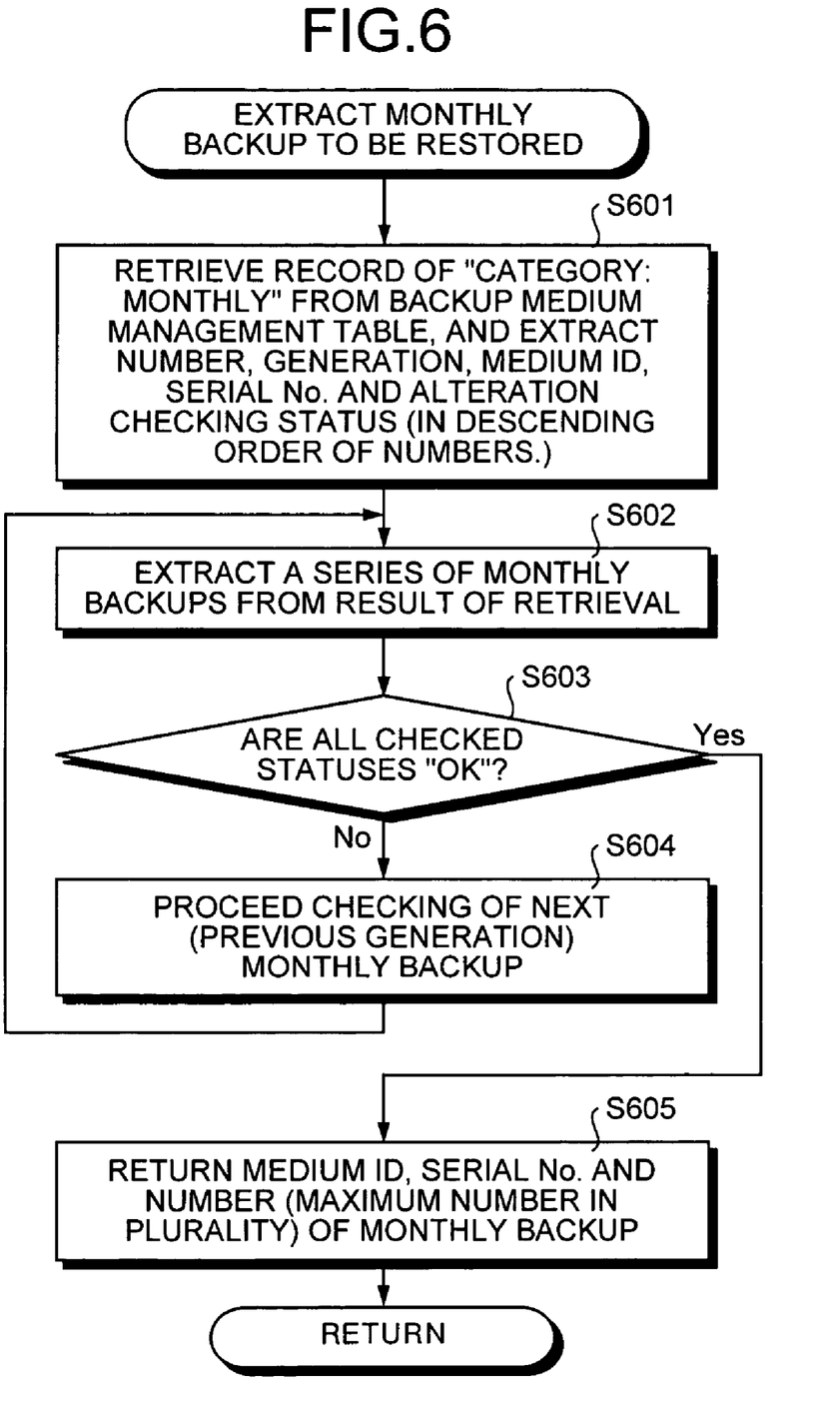
FIG. 6 is a flowchart of a monthly backup extraction processing.

FIG. 6 is a flowchart of the monthly backup extraction processing. At first, a record of "Category, Monthly" is retrieved from the backup medium management table 15 to extract data for Number, Generation, Medium ID, Serial No., and Alteration checking status (step S601).

A series of monthly backups is extracted from the result of retrieval (step S602). If all the alteration checking statuses are "OK" (Yes at step S603), then Medium ID, Serial No., and Number (maximum number in plurality) of the monthly backups are returned (step S604).

If all the alteration checking statuses are not "OK" (No at step S603), then process proceeds to checking of the next (previous generation) monthly backup (step S605), and the processing from step S602 to step S603 is executed.

(B) Daily Backup Extraction Processing

Figure 7:
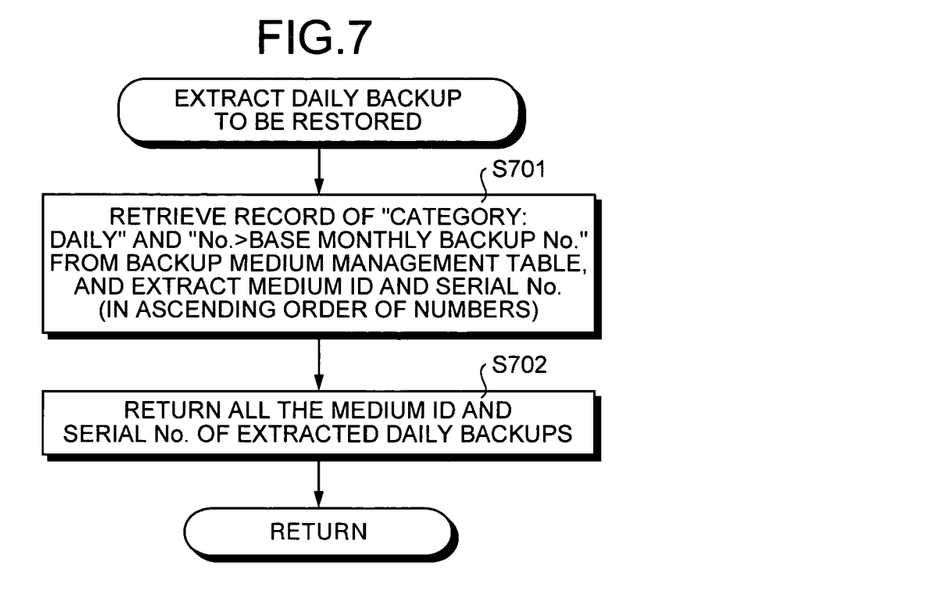
FIG. 7 is a flowchart of a daily backup extraction processing.

FIG. 7 is a flowchart of the daily backup extraction processing. At first, a record of "Category, Daily" and "No.>base monthly backup No." is retrieved from the backup medium management table 15 to extract data for Medium ID and Serial No. (step S701), and all the Medium ID and Serial No. of the extracted daily backup are returned (step S702).

(C) Restoration Processing

Figure 8:
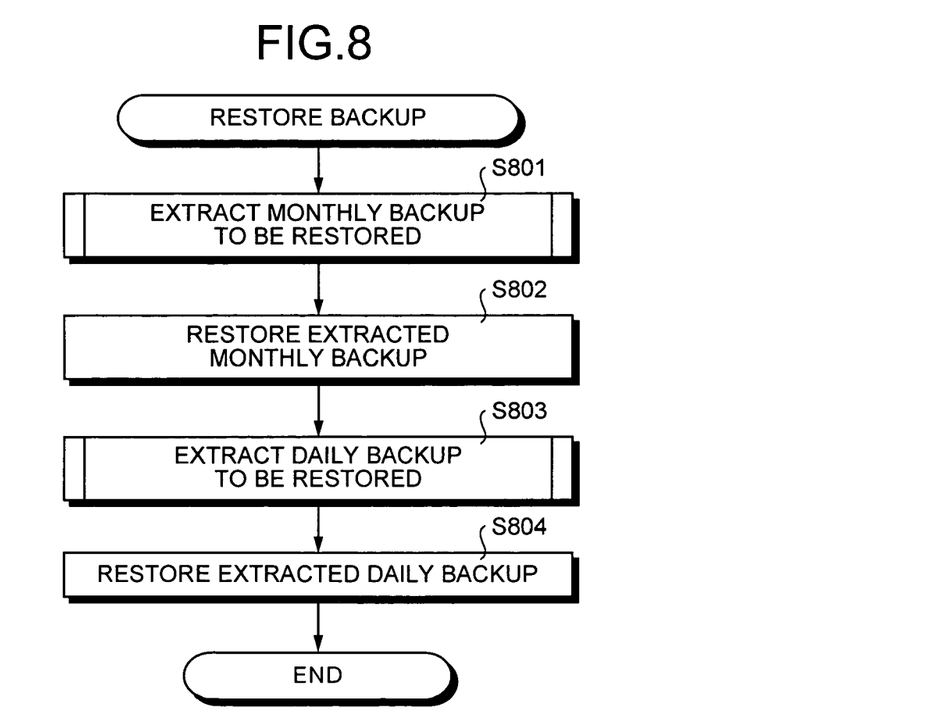
FIG. 8 is a flowchart of the restoration processing.

FIG. 8 is a flowchart of the restoration processing. At first, a monthly backup to be restored is extracted, that is, Medium ID, Serial No., and Number of the monthly backup are received (step S801), and the extracted monthly backup is restored (step S802). Then, a daily backup to be restored is extracted, that is, Number of the daily backup is specified and Medium ID and Serial No. of the daily backup are received (step S803), and all the extracted daily backups are restored (step S804).

As explained above, the environment of the original document data is restored by the monthly backups, and daily updates are restored by the daily backups. Therefore, when alteration is detected in the alteration checking processing, it is possible to restore the original document data to a latest state thereof that is right before the data is altered.

Of the processing explained in the embodiment, the whole or a part of the processing that is automatically performed is explained, but it can be manually performed. Alternatively, the whole or a part of the processing that is manually performed is explained, but it can also be automatically performed using a known method. In addition, the information including the processing procedure, control procedure, specific names, and various data and parameters given in the documents and figures can be altered to arbitrary ones unless otherwise specified.

Furthermore, the components of the shown devices are conceptually functioned, and therefore, they are not necessarily required to be configured physically as shown in the figures. In other words, a specific mode of distribution or integration of the devices is not limited to those in the figures. The whole or a part of the components can be functionally or physically distributed or integrated in arbitrary units according to various loads or their use patterns.

The alteration checking method ("alteration checking processing" and "restoration processing") explained in the embodiment is also realized by executing a previously prepared program. The program can be distributed through a network such as Internet. Further, the program is also executed by being recorded in a computer-readable recording medium such as a hard disk, flexible disk (FD), compact disk read-only memory (CD-ROM), MO, and DVD, and being read from the recording medium by the computer.

As explained above, according to the present invention, it is possible to perform other operation while the alteration of the data is being checked. This enables the system to be used more effectively.

Furthermore, it is possible to obtain the alteration checking apparatus capable of assuring the integrity of the backed-up original document data.

Moreover, it is possible to obtain the alteration checking apparatus capable of preferentially performing alteration checking on original document data related to an access request, and preventing alteration of original document data that has been backed up but has not been checked whether it is altered.

Furthermore, it is possible to obtain the alteration checking apparatus capable of restoring original document data up to a latest state thereof that is right before it is altered when the alteration is detected in the alteration checking processing.

According to another aspect of the present invention, the access to original document data is prohibited only when the original document data is backed up from the original document storage unit. Therefore, it is possible to obtain the alteration checking program capable of reducing influence upon operations to a minimum when the original document data is backed up.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An alteration checking apparatus comprising:
    a back-up unit that copies original data from an original data storage unit to a back-up data storage unit as back-up data without checking alteration of the original data;
    a list storing unit that stores information relating to the original data copied by the back-up unit, the information indicating that authenticity is assured to the original data copied by the back-up unit; and
    an alteration checking unit that, after copying of the original data as the back-up data is over, decides whether the original data has been altered based on the information relating to the original data copied and original data stored in the original data storage unit and notifies a user of decided alteration, and
    wherein the alteration checking unit writes information in the list storing unit relating to original data that have been copied successfully as the back-up data and relating to original data that are decided to be not altered, the information indicating that authenticity of the original data is assured.

2. The alteration checking apparatus according to claim 1, further comprising:
    a restoration unit that restores original data when the alteration checking unit decides that the original data has been altered, based on latest original data corresponding to the original data to be restored from the back-up storage unit.

3. The alteration checking apparatus according to claim 1, further comprising a request processing unit that denies access to the original data in the original data storage unit while back-up unit is copying the original data and that allows access to the original data in the original data storage unit while the alteration checking unit is deciding whether the original data has been altered.

4. An alteration checking apparatus comprising:
    a back-up unit that copies original data from an original data storage unit to a back-up data storage unit as back-up data without checking alteration of the original data;
    a list storing unit that stores information relating to original data copied by the back-up unit, the information indicating that authenticity is assured to the original data copied by the back-up unit; and
    an alteration checking unit that, after copying of the original data as the back-up data is over, decides whether the original data has been altered based on the information relating to the original data copied and original data stored in the original data storage unit and notifies a user of decided alteration, and
    wherein the alteration checking unit adds information to the information relating to original data, in the list storing unit, that indicates that original data is not altered corresponding to original data that the alteration checking unit decides as to be not altered.

5. A method of taking a back-up of original data and deciding whether the original data has been altered, comprising:
    copying the original data as back-up data without checking alteration of the original data;
    storing information relating to original data copied by the back-up unit in a list storing unit, the information indicating that authenticity is assured to the original data copied by the back-up unit; and
    deciding, after the copying is over, whether the original data has been altered based on the information relating to the original data copied and original data stored in an original data storage unit; and
    notifying a user of decided alteration, and
    wherein the deciding includes writing information in the list storing unit relating to original data that have been copied successfully as the back-up data and relating to original data that are decided to be not altered, the information indicating that authenticity of the original data is assured.

6. The method according to claim 5, further comprising:

denying access to the original data in the original data storage unit during the copying; and allowing access to the original data in the original data storage unit during the deciding.

7. A computer-readable recording medium recording a computer program containing instructions which when executed on a computer causes the computer to execute:

copying the original data as back-up data without checking alteration of the original data;

storing information relating to original data copied in a list storing unit, the information indicating that authenticity is assured to the original data copied by the back-up unit; and deciding, after the copying is over, whether the original data has been altered based on the information relating to the original data copied and original data stored in an original data storage unit; and notifying a user of decided alteration, and wherein the deciding includes writing information in the list storing unit relating to original data that have been copied successfully as the back-up data and relating to original data that are decided to be not altered, the information indicating that authenticity of the original data is assured.

8. The computer-readable recording medium according to claim 7, further comprising:

denying access to the original data in the original data storage unit during the copying; and allowing access to the original data in the original data storage unit during the deciding.

9. An alteration checking apparatus comprising:

a back-up unit that copies original data without checking alteration of the original data;

a list storing unit that stores information relating to original data copied by the back-up unit, the information indicating that authenticity is assured to the original data copied by the back-up unit; and an alteration checking unit that, after copying of the original data is completed, determines whether the original data has been altered based on the information relating to the original data copied and the original data and provides a notification regarding whether the original data has been altered, and wherein the alteration checking unit adds information to the information relating to original data, in the list storing unit, that indicates that original data is not altered corresponding to original data that the alteration checking unit decides as to be not altered, the information indicating that authenticity of the original data is assured.

* * * * *